United States Patent
Alkemade et al.

(10) Patent No.: US 8,322,547 B2
(45) Date of Patent: Dec. 4, 2012

(54) REMOVAL OF SEDIMENT FROM A CONTAINER HOLDING LIQUID

(76) Inventors: Patrick William Alkemade, Lindenow (AU); Brett Shellcot, Caboolture (AU)

(*) Notice: Subject to any disclaimer, the term of this patent is extended or adjusted under 35 U.S.C. 154(b) by 498 days.

(21) Appl. No.: 12/223,181

(22) PCT Filed: Sep. 4, 2006
(Under 37 CFR 1.47)

(86) PCT No.: PCT/AU2006/001291
§ 371 (c)(1),
(2), (4) Date: Jul. 19, 2010

(87) PCT Pub. No.: WO2007/085040
PCT Pub. Date: Aug. 2, 2007

(65) Prior Publication Data
US 2011/0000848 A1    Jan. 6, 2011

(30) Foreign Application Priority Data

Jan. 25, 2006 (AU) .............................. 2006900364

(51) Int. Cl.
| | |
|---|---|
| B65D 51/16 | (2006.01) |
| B65D 39/00 | (2006.01) |
| B65D 41/00 | (2006.01) |
| B65D 43/00 | (2006.01) |
| B65D 47/00 | (2006.01) |
| B65D 51/00 | (2006.01) |
| C12G 3/06 | (2006.01) |
| A23P 1/00 | (2006.01) |

(52) U.S. Cl. ........ 215/227; 220/368; 99/277.1; 426/495

(58) Field of Classification Search .................. 215/227; 220/368; 99/277.1; 426/495
See application file for complete search history.

(56) References Cited

U.S. PATENT DOCUMENTS

| | | | |
|---|---|---|---|
| 2,139,961 A | 12/1938 | Kleid | |
| 2,418,630 A | * 4/1947 | Febbraro | ........................ 215/316 |
| 3,856,169 A | 12/1974 | Wilson et al. | |

(Continued)

FOREIGN PATENT DOCUMENTS

DE    3821512 A1    12/1989

(Continued)

OTHER PUBLICATIONS

International Search Report for PCT/AU2006/001291 dated Oct. 31, 2006.

*Primary Examiner* — Anthony Stashick
*Assistant Examiner* — Andrew T Kirsch
(74) *Attorney, Agent, or Firm* — Jones Day

(57) ABSTRACT

A sediment removal assembly (10) is provided for removal of sediment (110) in a container (100). The assembly has a container seal (12) for sealing an opening (114) to the container. The container seal is formed with a seal body (14) with a flow through passageway (20) between opposite ends of the seal body, and a valve arrangement (26) with a valve member (34) normally spring biassed to close said passageway. One end of said seal body is adapted to sealingly engage said container at an opening thereof to close the opening. The assembly also has a sediment reservoir (40) adapted for removable sealing engagement with the opposite end of the seal body and in communication with the flow through passageway so that upon opening the valve member.

10 Claims, 6 Drawing Sheets

U.S. PATENT DOCUMENTS

| | | | |
|---|---|---|---|
| 3,986,627 A * | 10/1976 | Zapp | 215/237 |
| 4,502,604 A | 3/1985 | Martus | |
| 4,687,115 A | 8/1987 | Bongiovanni | |
| 4,932,543 A | 6/1990 | Martus | |
| 5,614,236 A | 3/1997 | Klang | |
| 6,260,474 B1 | 7/2001 | Yahav | |

FOREIGN PATENT DOCUMENTS

| | | |
|---|---|---|
| FR | 2559741 A1 | 8/1985 |
| WO | WO 01/56354 A2 | 8/2001 |

* cited by examiner

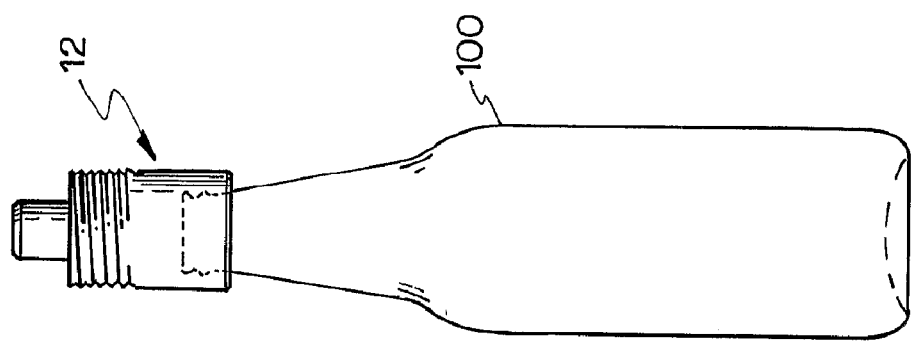
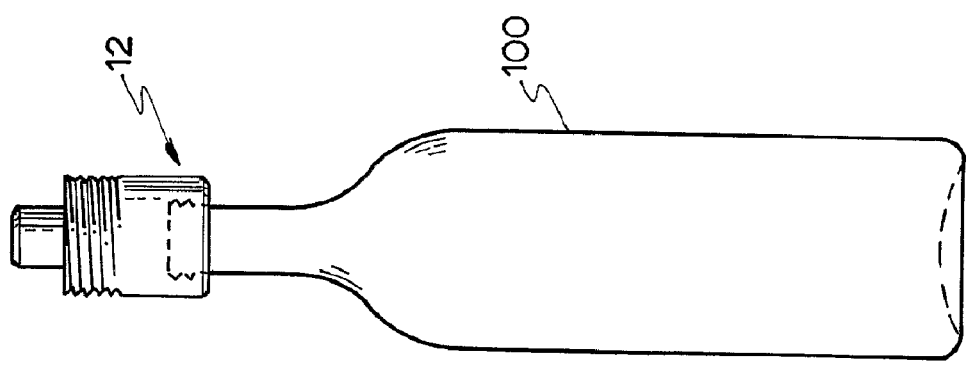

REMOVAL OF SEDIMENT FROM A CONTAINER HOLDING LIQUID

CROSS REFERENCE TO RELATED APPLICATION

This application is the National Phase application of International Application No. PCT/AU2006/001291, filed 4 Sep. 2006, which designates the United States and was published in English. This application, in its entirety, is incorporated herein by reference.

FIELD OF THE INVENTION

THIS INVENTION relates to removal of sediment from a container holding liquid and in particular but not limited to removal of sediment from bottled beverages using a sediment removal assembly.

BACKGROUND OF THE INVENTION

Bottled beverages that employ secondary fermentation inside a bottle to produce a carbonated beverage have sediment comprising dead yeast and other material in the bottom of the bottle. The beverage must be decanted or the beverage drunk in a cloudy state. A prominent example of this is home brewed beer.

OBJECT OF THE INVENTION

It is an object of the present invention to provide a sediment removal assembly arranged to alleviate or to at least reduce to a certain level one or more of the prior art disadvantages.

It is another object of the present invention to provide a sediment removal assembly for removal of the sediment from a container while maintaining the integrity of the liquid within the container.

SUMMARY OF THE INVENTION

In one aspect therefore, the present invention resides in a sediment removal assembly for a container. The assembly comprises a container seal having a seal body formed with a flow through passageway between opposite ends of the seal body, and a valve arrangement having a valve member adapted to be normally in a closed position for closing said passageway. One end of said seal body is adapted to sealingly engage said container at an opening thereof, thereby normally closing said opening to the container. The assembly further comprises a sediment reservoir adapted for removable sealing engagement with the opposite end of the seal body and communicating with the flow through passageway so that upon opening the valve member a predetermined amount of liquid may flow through the flow through passageway from the container into the reservoir and any sediment may be delivered gravitationally into the reservoir for accumulation of sediment in the reservoir and removal thereof from the container after the flow through passageway is closed. The reservoir for accumulation of sediment includes a reservoir body having a valve actuator adapted to actuate the valve member as the reservoir body is being applied to engage the opposite end of the valve body to an open position to thereby automatically open the passageway and at the same time maintain a further seal to the exterior.

In another aspect therefore, the present invention resides in a sediment removal assembly for a container. The assembly comprises a container seal having a seal body formed with an open end and a closed end which is opposite to said open end. The seal body has a reservoir adjacent to said closed end and a flow passageway leading from said open end to said reservoir. The assembly further comprises a valve arrangement having a valve member adapted to be manually movable between a closed position for closing said passageway to the reservoir and an open position for opening said passageway to the reservoir so that upon opening the valve member a predetermined amount of liquid may flow through the passageway when the valve member is open from the container into the reservoir and any sediment may be delivered gravitationally into the reservoir for accumulation of sediment in the reservoir and removal thereof from the container after the valve flow through passageway is closed.

Preferably the seal containing the valve arrangement or "valved seal" substitutes for a crown seal or screw top cap or other conventional seal normally used to close the container. In the case of a crown seal the valved seal preferably comprises a clamp means adapted to seal against the lip of the bottle which would normally be closed by a crown seal. In the case of a screw top cap, the valved seal typically includes a threaded section having an internal thread applied to the outer thread on the container neck to close and seal the container.

In a preferred form, the reservoir for accumulation of sediment includes a reservoir body having a valve actuator to actuate the valve in the valved seal as the reservoir body is being applied to the valved seal to automatically open the valve and at the same time maintain a further seal to the exterior.

Typically, seals are provided by multiple o-rings contained in the valve, the valve itself and also in the valve actuator.

In another embodiment, in the case of a bottle normally closed by a cork or a crown seal, a clamp arrangement may be applied utilising appropriate clamp members to seal about the opening to the bottle or container.

In each case while the bottle or container is inverted, in its connection to the valve member seal and the reservoir for accumulation of sediment external to the container the valve may be manually or automatically opened so that sediment may flow by gravity into the reservoir.

BRIEF DESCRIPTION OF THE DRAWINGS

In order that the present may be more readily understood and be put into practical effect reference will now be made to the accompanying drawings which illustrate preferred embodiments of the invention and wherein:—

FIGS. 6 and 7 illustrate an assembly as applied to a wine bottle and beer bottle respectively.

DETAILED DESCRIPTION OF THE DRAWINGS

Figure 1:
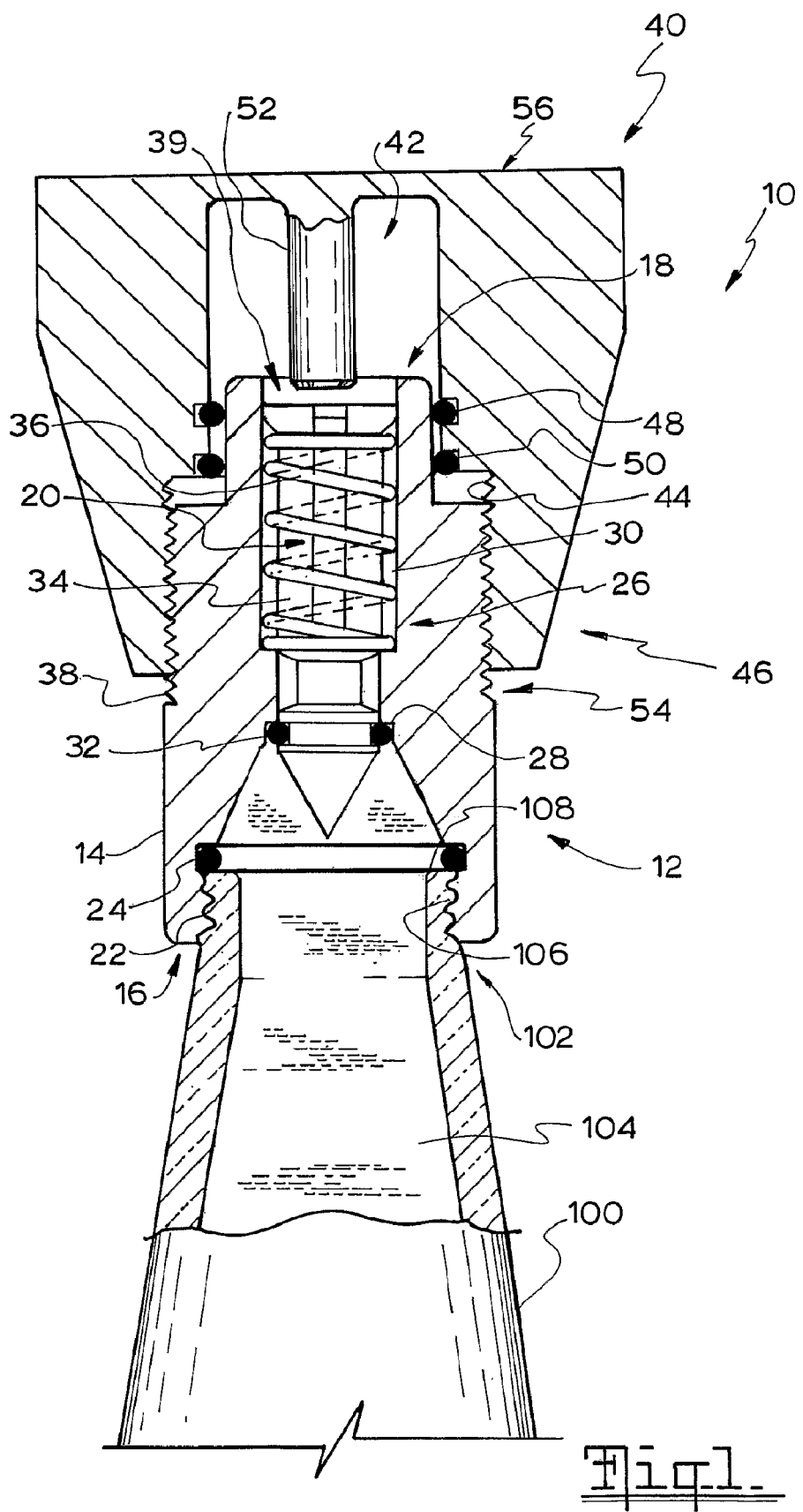
FIG. 1 is a section through the sediment removal assembly according to the present invention prior to actuation of the valve.
Figure 2:
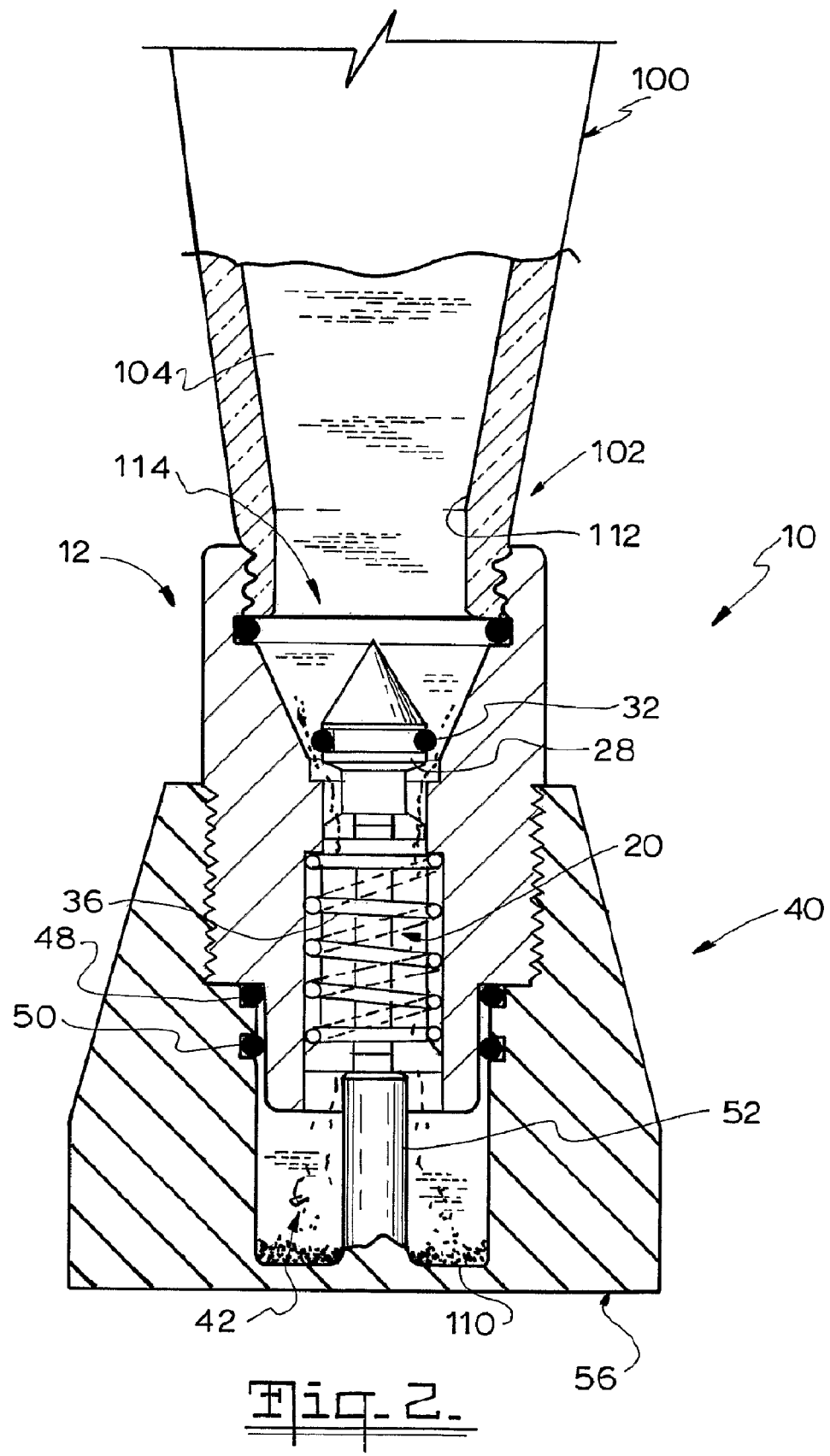
FIG. 2 illustrates removal of sediment with the container inverted and the valve actuated.

Referring to the drawings and initially to FIGS. 1 and 2, there is illustrated in FIG. 1 a sediment removal assembly 10 comprising a seal 12 having a cylindrical seal body 14 with opposite ends 16 and 18, and a flow through passageway 20 between those ends. The end 16 is applied to the top 102 of a bottle 100 containing a beverage 104. The end 16 has an internal screw threaded portion at 22 shown co-operating with an external screw thread portion 106 on the bottle 100 and an o-ring seal member at 24. The screw threaded portion 22 forces the o-ring 24 into sealing engagement against rim 108 of the bottle 100.

The seal 12 has a valve arrangement 26 comprising a valve seat 28 which co-operates with a valve member 30 having an o-ring seal member 32 carried on a valve body 34. The valve body 34 is held in the normally closed position by a biasing spring 36. Thus, the o-ring seal member 32 and the o-ring seal member 24 co-operate to seal the bottle 100 when the valve member 30 is closed.

The sediment removal assembly 10 further comprises a valve actuator 40 formed with a reservoir 42. The actuator 40 has an internal thread 44 at its open end portion 46 which co-operates with an external thread 38 on the seal body 14. Seals members 48 and 50 provide a seal for the sediment accumulation reservoir 42 in the valve actuator 40.

An actuating pin 52 bears down against the upper end portion 39 of the valve body 34 as the valve actuator 40 is screwed down onto the seal body 14. As can be seen in FIG. 1, the valve actuator 40 has not been screwed completely down onto the seal body 14 and there is a gap at 54 whereby upon further application of the actuator 40, the pin 52 will engage with the valve member 34 to open the valve against the bias of spring 36.

Once the actuator 40 is placed in position as illustrated in FIG. 1, the whole assembly 10 and bottle 13 may be inverted to the position illustrated in FIG. 2. The actuator 40 has a relatively broad flat surface 56 for the bottle 100 to rest in the inverted position. The actuator 40 is then fully applied to the seal 12 to open the valve such that liquid may flow from the bottle 100 through the valve passage 20 and into the sediment accumulation reservoir 42 in the actuator 40. This is depicted graphically in FIG. 2.

It will be appreciated that, by gravitation, sediment 110 is normally deposited in the bottom of the bottle 100 (not shown) when in a normal upright position but when inverted the sediment 110 will make its way down through the neck 112 and an opening 114 of the bottle 100 and through the passageway 20 in the valve member 30 and into the sediment accumulation reservoir 42. The need to invert the bottle 100 may be avoided by carrying out the secondary fermentation with the bottle inverted and the valve open. The reservoir 42 may be removed while the bottle is still inverted automatically closing the valve member 30 and keeping the bottle 100 sealed.

Parts of the assembly 10 may be made transparent to enable visual inspection of the operation of the sediment removal process. Once the sediment 110 has been removed to the satisfaction of the user, then it is simply a matter of the user removing the valve actuator 40 which will thereby enable the bottle 100 to be re-sealed by reason of the action of the bias spring 36 upon the valve member 30. It will be appreciated that this will therefore result in removal a small predetermined amount of liquid from the container 100 comprising that portion in volume occupied by the sediment accumulation reservoir 42 and the space available around the valve member 30 from the o-ring 32 outward.

Figure 3:
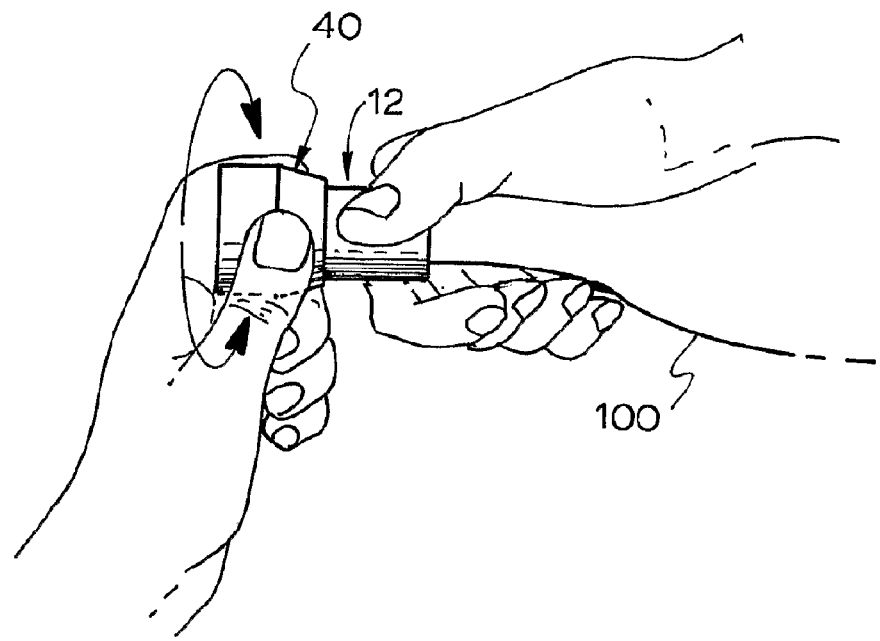
FIG. 3 is a drawing illustrating removal of the valve actuator and reservoir.
Figure 4:
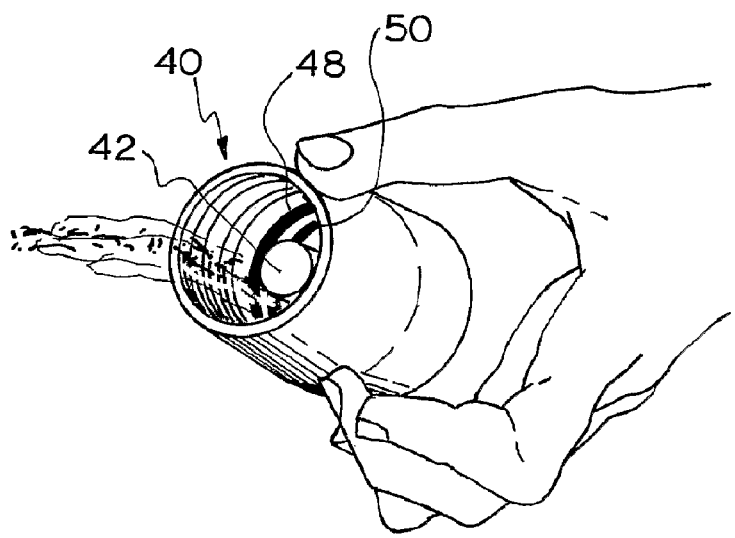
FIG. 4 is a drawing illustrating cleaning of the valve actuator by removal of sediment and a predetermined amount of liquid from the valve actuator.

FIGS. 3 and 4 illustrate removal of the actuator 25 and its cleaning in FIG. 4.

Figure 5:
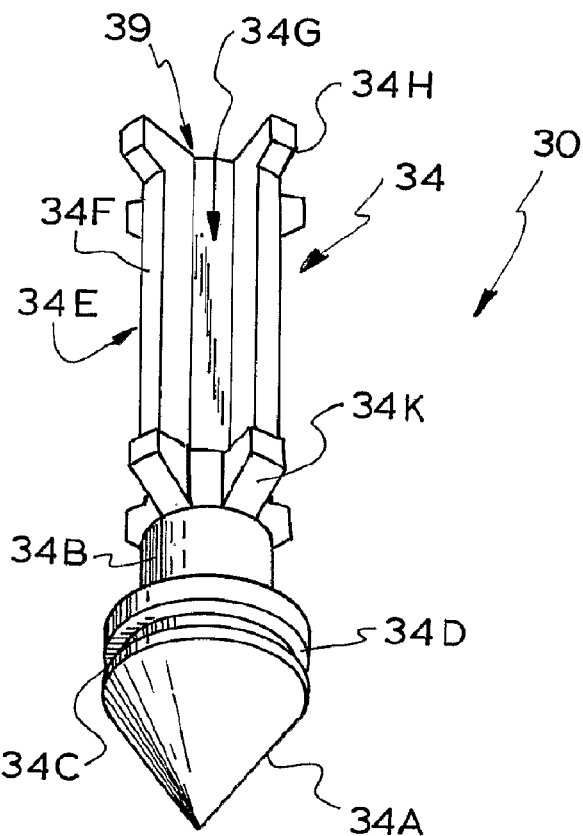
FIG. 5 is an exploded drawing illustrating the valve body, its return spring and a ring seal.

The valve member 30 is illustrated in greater detail in FIG. 5 and FIGS. 6 and 7 illustrate application of the seal 12 to wine and beer bottles respectively. It will be appreciated the seal 12 may be a push fit, may comprise screw fit or may comprise clamping means of conventional form utilised to retain the seal in engagement with the bottle 100. In this regard in the case of on a non-screw thread bottle, the seal comprising the o-ring 24 may be applied by a further spring located in the seal and that portion comprising the internal thread 22 of the seal may comprise hinge members which fit around the lip of the bottle so that a spring is used to apply the seal 24 to the bottle. This is a conventional sealing arrangement typically utilised for Sparkling Wines and may be adapted and suitably applied in the present case.

Referring to FIG. 5, the valve member 30 as shown has its valve body 34 formed with an enlarged and substantially conical shaped valve head 34A extending from a neck portion 34B. The valve head 34A has a cylindrical portion 34C adjacent to the neck portion 34B. The cylindrical portion 34C is formed with a periphery groove 34D adapted to receive and retain thereat the sealing ring 32. The sealing ring 32 will engage the valve seat 28 when the valve member 30 is in the closed position as shown in FIG. 1 and will moved away from the valve seat 28 when the valve member is in the open position so that the passageway 20 is open for the sediment 110 to flow into the reservoir 42 as shown in FIG. 2. A tail portion 34E is joined to the neck portion 34B. The tail portion 34E has spaced radially extending elements 34F adapted to form longitudinal flow passages 34G between adjacent elements 34F. Each of the elements 34F has extended end parts 34H and 34K forming a recessed space for receiving the spring 36.

Figure 8:
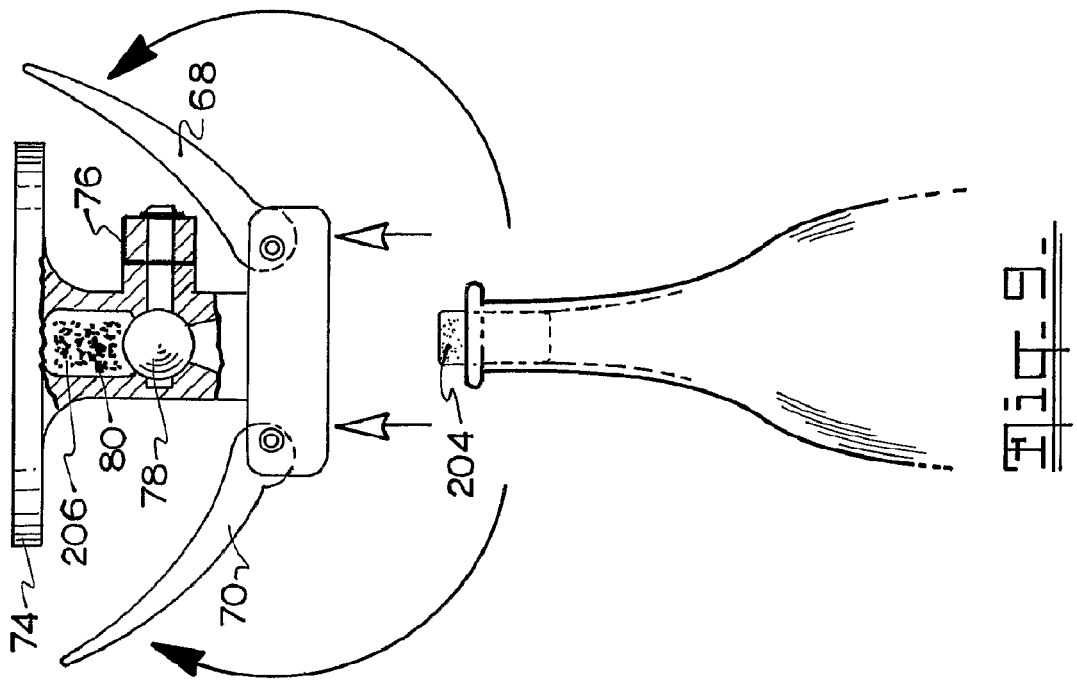
FIGS. 8 and 9 illustrate an alternative embodiment.
Figure 9:
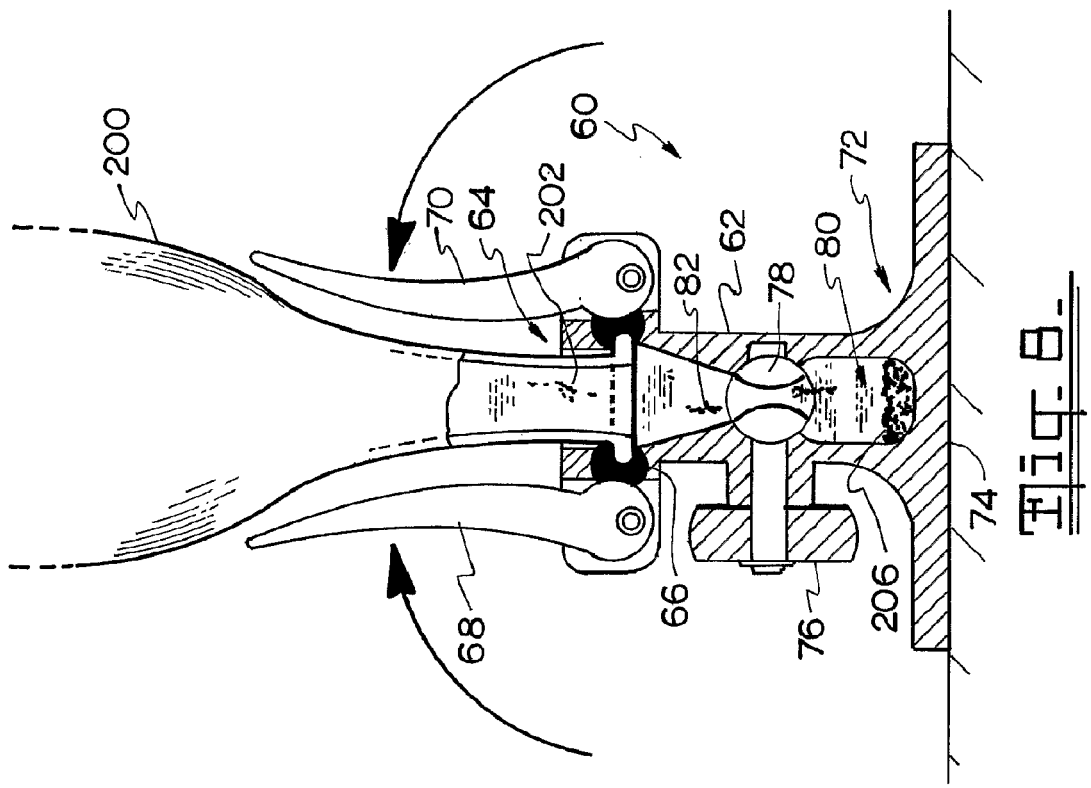

Referring now to FIGS. 8 and 9 there is illustrated an alternative embodiment typically used in conjunction with still wines such as red and any particular red wines where there is a tendency for accumulation of sediment in wine as it ages. The alternative to this process would be the normal decantation process.

In FIG. 8 there is illustrated a bottle 200 and a sediment removal assembly 60 having a body member 62 with an open end portion 64 arranged to seal an opening 202 to the bottle 200. The assembly 60 includes a sealing ring 66 at the end portion 64 and the ring 66 is applied to the opening 43 by respective clamping arms 68 and 70 prior to the bottle 200 along with assembly 60 being inverted into the inverted position of FIG. 8. The assembly 60 has a closed end 72 with a relatively large flat external surface 74 so that the bottle 200 will remain supported in the inverted position by the assembly 60. It will be appreciated that cork 204 has been removed from the bottle 200. Upon inversion, a valve actuator 76 is manually turned to operate a valve member 78 to move to the open position and a small amount of wine is discharged from the bottle 200 into that part of the assembly downstream whilst on the seal member 62. Sediment 206 then flows into the sediment accumulation chamber or reservoir 80 as depicted in FIG. 8. Once the sediment 206 from the bottle 200 is in the chamber 80, the valve 78 is moved to the closed position by turning the actuator 76. The bottle 200 can then be returned to the upright position illustrated in FIG. 9 and that portion of liquid at 82 flows back into the bottle. The assembly 60 may be removed from the bottle 200 and the bottle may be then re-corked as illustrated in FIG. 9.

Whilst the above has been given by way of illustrative example of the present invention many variations and modifications thereto will be apparent to those skilled in the art without departing from the broad ambit and scope of the invention as herein set forth in the following claims.

The invention claimed is:

1. A sediment removal assembly for removal of sediment from a bottle comprising:
   a container seal having a cylindrical body including a first end and an opposite end with a flow through passageway therebetween, wherein the first end is configured to sealingly engage against a rim of the bottle;
   a valve arrangement supported within the passageway, the valve arrangement comprising a valve member biased toward a valve seat in the container seal such that the valve arrangement is in a closed position; and
   a reservoir configured to threadably engage with the opposite end of the container seal, the reservoir comprising a valve actuator configured such that as the reservoir is threadably engaged with the container seal, the valve actuator engages with the valve member to move the valve arrangement to an open position;
   wherein liquid is stopped from flowing from the bottle through the flow through passageway when the valve arrangement is in the closed position, and liquid is permitted to flow from the bottle through the flow through passageway when the valve arrangement is in the open position.

2. The assembly of claim 1 wherein the container seal is adapted as a substitute for a crown seal.

3. The assembly of claim 2 wherein the container seal further comprises a clamp adapted to sealingly engage with the rim of the bottle.

4. The assembly of claim 1 wherein the container seal is adapted as a substitute for a screw top cap for the bottle.

5. The assembly of claim 4 wherein the container seal further comprises a threaded section at the first end having an internal thread configured to be applied to an outer thread on a neck of the bottle to close and seal the bottle.

6. The assembly of claim 1 further comprising a sealing arrangement adapted to prevent escape of liquid when the container seal is in engagement with the bottle and/or when the valve actuator is in engagement with the valve member.

7. The assembly of claim 6 wherein the sealing arrangement comprises a first seal element supported on the valve member that is adapted to seal the bottle when the valve arrangement is in the closed position.

8. The assembly according to claim 6 wherein the sealing arrangement has one or more second sealing elements supported on the reservoir that are adapted to seal an area between the reservoir and the container seal.

9. The assembly according to claim 1 wherein the container seal includes a clamp arrangement having clamp members operable to seal about the rim of the bottle.

10. The assembly according to claim 1 wherein the reservoir or container seal has a relatively large and substantially flat exterior surface adapted to support the bottle in an inverted position when the bottle is in engagement with the assembly.

* * * * *